(12) United States Patent
Fletcher et al.

(10) Patent No.: US 8,921,263 B2
(45) Date of Patent: Dec. 30, 2014

(54) MICROWAVE ENERGY-ASSISTED, CHEMICAL ACTIVATION OF CARBON

(75) Inventors: Tonia Havewala Fletcher, Big Flats, NY (US); Kishor Purushottam Gadkaree, Painted Post, NY (US); Kamjula Pattabhirami Reddy, Corning, NY (US); Rebecca Lynn Schulz, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 267 days.

(21) Appl. No.: 13/590,568

(22) Filed: Aug. 21, 2012

(65) Prior Publication Data

US 2014/0056798 A1 Feb. 27, 2014

(51) Int. Cl.
*C01B 31/12* (2006.01)
*C01B 31/08* (2006.01)

(52) U.S. Cl.
CPC ............... *C01B 31/12* (2013.01); *C01B 31/086* (2013.01)
USPC .......................................... 502/423; 502/436

(58) Field of Classification Search
CPC .............................. C01B 31/086; C01B 31/12
USPC ................................................. 502/423, 436
See application file for complete search history.

(56) References Cited

U.S. PATENT DOCUMENTS

2011/0312485 A1    12/2011    Hashisho et al. .................. 502/5

FOREIGN PATENT DOCUMENTS

| CA | 2 008 242 | 4/2000 |
|----|-----------|--------|
| CN | 1 669 919 | 9/2005 |
| CN | 101 391 768 | 3/2009 |
| CN | 102 249 224 | 11/2011 |
| JP | 2004-352595 | 12/2004 |
| JP | 2006-089344 | 4/2006 |

OTHER PUBLICATIONS

Serial No. PCT/US2013/054458, International Search Report and Written Opinion, dated Feb. 7, 2014.

J.M.V. Nabais, et al., "Preparation and modification of activated carbon fibres by microwave heating", *Carbon*, 2004, vol. 42, pp. 1315-1320.
J.F. Gonzalez, et al., "Preparation of activated carbons from used tyres by gasification with steam and carbon dioxide", *Applied Surface Science*, 2006, vol. 252, No. 17, pp. 5999-6004.
J. Guo, et al., "Preparation of activated carbons from oil-palm-stone chars by microwave-induced carbon dioxide activation", *Carbon*, 2000, vol. 38, pp. 1985-1993.
T. Wang, et al., "Preparation and characterization of activated carbon from wood via microwave-induced ZnC12 activation", *Carbon*, 2009, vol. 47, No. 7, pp. 1867-1883.
E.A. Dawson, et al., "The generation of microwave-induced plasma in granular active carbons under fluidised bed conditions", *Carbon*, 2008, vol. 46, pp. 220-228.
P.J.M. Carrott, et al., "Microwave heating as a novel method for introducing molecular sieve properties into activated carbon fibres", *Carbon*, 2004, vol. 42, No. 1, pp. 227-229.
Y. Ji, et al., "Preparation of activated carbons by microwave heating KOH activation", *Applied Surface Science*, 2007, vol. 254, No. 2, pp. 506-512.
J.E. Atwater, et al., "Complex permittivities and dielectric relaxation of granular activated carbons at mircrowave frequencies between 0.2 and 26 GHz", *Carbon*, 2003, vol. 41, No. 9, pp. 1801-1807.
J.P. Boudou, et al., "Introduction of acidic groups at the surface of activated carbon by microwave-induced oxygen plasma at low pressure", *Carbon*, 2000, vol. 38, No. 7, pp. 1021-1029.
J.A. Menéndez, et al., "Modification of the surface chemistry of active carbons by means of microwave-induced treatments", *Carbon*, 1999, vol. 37, No. 7, pp. 1115-1121.
X. He, et al., "Preparation of microporous activated carbon and its electrochemical performance for electric double layer capacitor", *Journal of Physics and Chemistry of Solids*, 2009, vol. 70, pp. 738-744.
T. Wigmans, "Industrial Aspects of Production and Use of Activated Carbons", *Carbon*, 1989, vol. 27, No. 1, pp. 13-22.
F.K. Yuen, et al., "Recent Developments in the Preparation and Regeneration of Activated Carbons by Microwaves", *Advances in Colloid and Interface Science*, 2009, vol. 149, pp. 19-27.
J. Ahmad, et al., "Hydrogen embrittlement due to mild condensate contamination by sea water ingress through condenser tube leakages: A Case Study", *Desalination*, 2011, vol. 274, pp. 302-307.

*Primary Examiner* — Stuart Hendrickson
(74) *Attorney, Agent, or Firm* — Michael Russell (57) ABSTRACT

A method for forming activated carbon comprises forming a feedstock mixture from a carbon feedstock and a chemical activating agent, and heating the feedstock mixture with microwaves in a plurality of successive heating steps to react the carbon feedstock with the chemical activating agent and form activated carbon. Step-wise heating can be used to efficiently control the microwave activation process.

23 Claims, 8 Drawing Sheets

# MICROWAVE ENERGY-ASSISTED, CHEMICAL ACTIVATION OF CARBON

BACKGROUND

The present disclosure relates generally to methods for forming activated carbon, and more particularly to microwave energy-assisted, chemical activation of carbon using plural, discrete heating steps.

Energy storage devices such as ultracapacitors may be used in a variety of applications such as where a discrete power pulse is required. Example applications range from cell phones to hybrid vehicles. Ultracapacitors typically comprise a porous separator and an organic electrolyte sandwiched between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes.

Carbon-based electrodes suitable for incorporation into energy storage devices are known. Activated carbon, which forms the basis of the electrodes, can be made from natural or synthetic precursor materials. Natural precursor materials include coals, nut shells, and biomass. Synthetic precursor materials typically include phenolic resins. With both natural and synthetic precursors, the activated carbon can be formed by carbonizing the precursor and then activating the intermediate product. The activation can comprise physical (e.g., steam or $CO_2$) or chemical activation at elevated temperatures to increase the porosity and hence the surface area of the carbon.

Both physical and chemical activation processes typically involve large thermal budgets to heat and react the carbonized material with the activating agent. In the case of chemical activation, corrosive by-products can be formed when a carbonized material is heated and reacted with a chemical activating agent such as KOH. This can add complexity and cost to the overall process, particularly for reactions that are carried out at elevated temperatures for extended periods of time.

Accordingly, it would be an advantage to provide activated carbon materials and processes for forming activated carbon materials using a more economical chemical activation route. The resulting activated carbon materials can possess a high surface area to volume ratio and can be used to form carbon-based electrodes that enable efficient, long-life and high energy density devices.

SUMMARY

A method for forming activated carbon comprises providing a carbon feedstock, mixing the carbon feedstock with a chemical activating agent to form a feedstock mixture, introducing the feedstock mixture into a microwave reaction chamber, heating the feedstock mixture using a plurality of heating steps at respective processing temperatures using microwave energy, and reacting the carbon feedstock with the chemical activating agent to form activated carbon. Following the heating steps, the activated carbon can be water quenched to cool and wash the activated carbon.

Each heating step comprises maintaining the feedstock material at a processing temperature for a determined period of time. By incorporating a plurality of heating steps into the process, the reaction between the carbon feedstock and the chemical activating agent can be controlled. In embodiments, the plural heating steps are carried out in succession without reducing the carbon feedstock to room temperature until the process is complete.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

BRIEF DESCRIPTION OF THE DRAWINGS

The following detailed description can be best understood when read in conjunction with the following drawings, where like structures are indicated with like reference numerals and in which.

DETAILED DESCRIPTION

A method for making activated carbon from a carbon feedstock comprises providing a carbon feedstock, mixing the carbon feedstock with a chemical activating agent to form a feedstock mixture, introducing the feedstock mixture into a microwave reaction chamber, heating the feedstock mixture using microwave energy by introducing microwaves into the reaction chamber, reacting the carbon feedstock with the chemical activating agent to form activated carbon, and cooling the activated carbon. The act of heating comprises a plurality of heating steps at successive processing temperatures and respective hold times.

According to embodiments, the carbon feedstock may comprise a carbonized material such as coal or a carbonized material derived from a carbon precursor. Example carbon precursors include natural materials such as nut shells, wood, biomass, etc. and synthetic materials such as phenolic resins, including poly(vinyl alcohol) and (poly)acrylonitrile, etc. For instance, the carbon precursor can be comprise edible grains such as wheat flour, walnut flour, corn flour, corn starch, corn meal, rice flour, and potato flour. Other carbon precursors include coconut husks, beets, millet, soybean, barley, and cotton. The carbon precursor can be derived from a crop or plant that may or may not be genetically-engineered.

Further example carbon precursor materials and associated methods of forming carbon feedstock are disclosed in commonly-owned U.S. patent application Ser. Nos. 12/335,044, 12/335,078, 12/788,478 and 12/970,073, the entire contents of which are hereby incorporated by reference.

Carbon precursor materials can be carbonized to form carbon feedstock by heating in an inert or reducing atmosphere. Example inert or reducing gases and gas mixtures include one or more of hydrogen, nitrogen, ammonia, helium and argon. In an example process, a carbon precursor can be heated at a temperature from about 500° C. to 950° C. (e.g., 500, 550, 600, 650, 700, 750, 800, 850, 900 or 950° C.) for a predetermined time (e.g., 0.5, 1, 2, 4, 8 or more hours) and then optionally cooled. During carbonization, the carbon precursor may be reduced and decomposed to form carbon feedstock. In embodiments, the carbonization may be performed using a conventional furnace or by heating within the microwave reaction chamber using microwave energy. For instance, a carbon precursor can be exposed to microwave energy such that it is heated and reduced to char within a microwave reactor to form carbon feedstock that is then combined with a chemical activating agent to form a feedstock mixture that is then exposed to microwave energy to heat the feedstock mixture and form activated carbon.

It is envisioned that a single carbon precursor material or a specified combination of precursor materials could be used to optimize the properties of the activated carbon product, and that the precursor materials themselves may be converted to carbon feedstock using microwave energy, either in a batch or continuous manner, using processes similar to those described for forming carbon activated carbon.

Particles of the carbon feedstock suitable for activation may be prepared by milling or grinding the carbon feedstock. For example, prior to being combined with a chemical activating agent and introduced into the microwave reaction chamber, carbon feedstock may be milled to an average particle size of less than 100 microns, e.g., less than 100, 50, 20 or 10 microns. In embodiments, the carbon feedstock can have an average particle size of about 5, 10, 20, 50 or 100 microns. In further embodiments, the particle size of the carbon feedstock can range from 5 to 10 microns, 5 to 20 microns, 10 to 20 microns, 5 to 50 microns, 10 to 50 microns or 20 to 50 microns.

Prior to activation, the carbon feedstock (e.g., particles of the carbon feedstock) is combined with a chemical activating agent. The chemical activating agent may include an inorganic material such as $H_3PO_4$, NaOH, $Na_2CO_3$, NaCl, $MgCl_2$, KOH, $AlCl_3$, $P_2O_5$, $K_2CO_3$, KCl and/or $ZnCl_2$.

In embodiments, the carbon feedstock can be combined with a solution of the chemical activating agent. If a solution is used, it is preferably an aqueous solution and the concentration of chemical activating agent in the solution can range from about 10-90 wt. %. A feedstock mixture comprising carbon feedstock and a solution of the chemical activating agent can promote molecular-level mixing of the feedstock and the chemical activating agent prior to activation. This molecular-level mixing can facilitate formation of a homogeneous activated carbon that comprises a uniform distribution of physical characteristics including pore size, pore size distribution, pore structure, etc. In further embodiments, the carbon feedstock can be combined with the chemical activating agent to form a dry feedstock mixture, i.e., without the use of any liquid or solvent.

The carbon feedstock and the chemical activating agent can be combined in any suitable ratio to form the feedstock mixture. The specific value of a suitable ratio may depend, for example, on the physical form of the carbon precursor and the chemical activating agent and the concentration if one or both are in the form of a mixture or solution. A ratio of carbon precursor to chemical activating agent on the basis of dry material weight can range from about 1:10 to 10:1. For example, the ratio can be about 1:1, 1:2, 1:3, 1:4, 1:5, 1:10, 10:1, 5:1, 4:1, 3:1 or 2:1.

Figure 1:
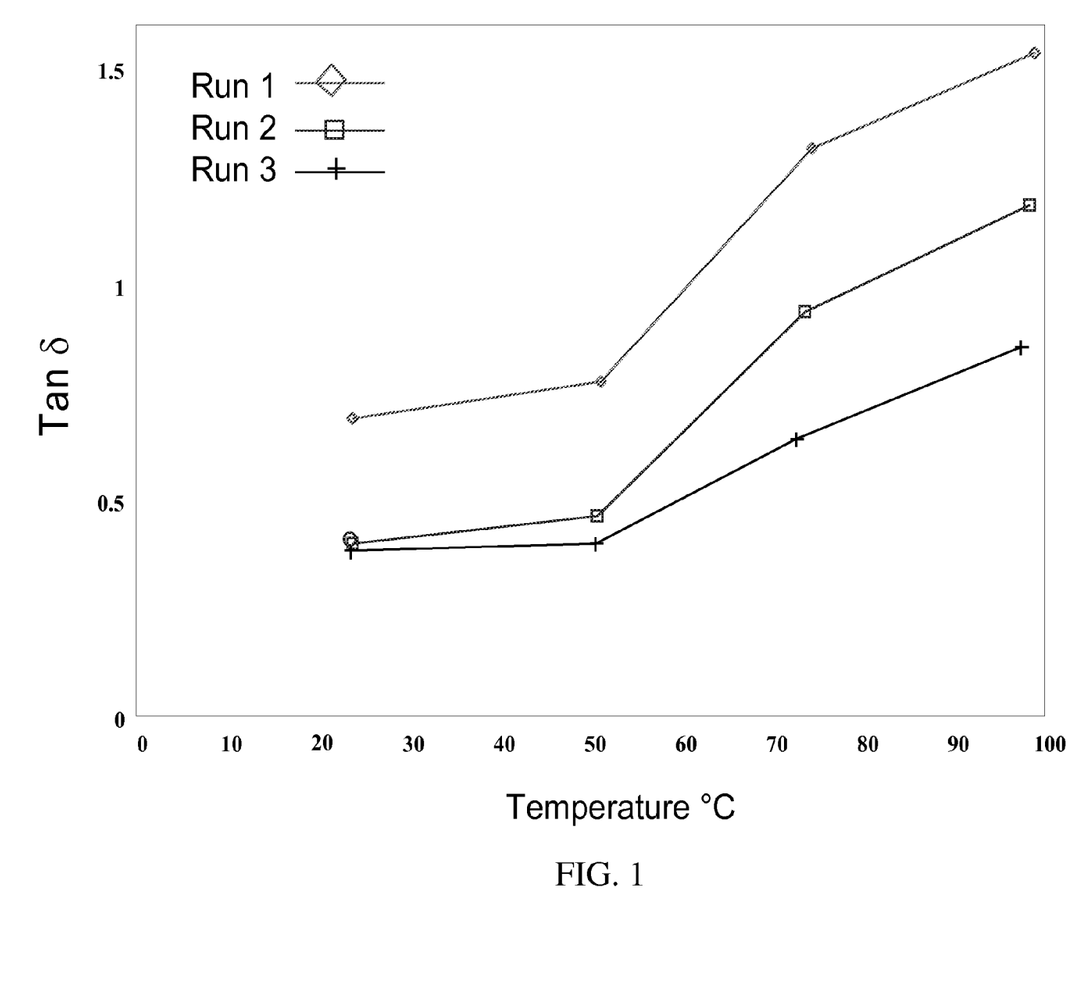
FIG. 1 is a plot of the dissipation factor versus temperature for an example feedstock mixture.

To form activated carbon, the feedstock mixture is introduced into a microwave reaction chamber where it is heated using microwave energy to react the carbon feedstock with the chemical activating agent. During activation, the microwave energy directly couples to the carbon feedstock, the chemical activating agent (e.g., KOH), and water if present. There materials readily absorb microwave energy as illustrated in FIG. 1, which is a plot of the dissipation factor (tan δ) versus temperature for a feedstock mixture (carbon and KOH). The three curves represent three repeat measurements of the same sample.

A chemical activating agent such as KOH can interact and react with the carbon such that the potassium ion is intercalated into the carbon structure and potassium carbonate is formed. Microwave energy is believed to increase the reaction kinetics for both these processes, which can lead to a higher rate of activation. The uniformity of the heating and attendant reaction with the activating agent result in a desired pore structure and pore size distribution, which correlates to a desired energy density and power density. As used herein, activation refers to a process whereby the surface area of carbon is increased such as through the formation of pores within the carbon.

A microwave generator can produce microwaves having a wavelength from 1 mm to 1 m (frequencies ranging from 300 MHz to 300 GHz), though particular example microwave frequencies used to form activated carbon include 915 MHz, 2.45 GHz, and microwave frequencies within the C-band (4-8 GHz). Within a microwave reaction chamber, microwave energy can be used to heat a feedstock mixture to a predetermined temperature via a predetermined thermal profile.

Microwave reactors can have a single-mode, multi-mode or variable-frequency format. A variable-frequency microwave reactor, for example, can use C-band microwaves and a traveling wave tube to constantly sweep through a plurality of frequencies (e.g., 4096 frequencies) in as little as 100 msec. The resulting microwave energy can be launched through a waveguide into the reaction chamber. By sweeping through a range of frequencies, a uniform field can be created, which can result in a homogeneous temperature distribution across the feedstock mixture. The field homogeneity achievable using a variable frequency microwave reactor can improve upon the homogeneity using a traditional multi-mode device, for example.

In a multi-mode reactor, discrete pockets of energy can form and in embodiments the carbon feedstock mixture can be moved through the field using a rotational device. Alternatively, the energy from a multi-mode reactor can be intentionally perturbed as it is enters the reaction chamber using, for example, a mode stirrer, such as a rotating fan that distributes the energy throughout the reaction chamber.

Figure 2:
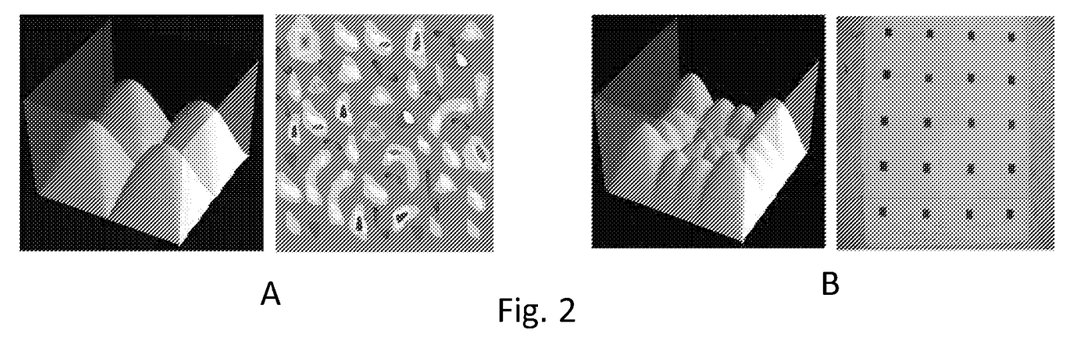
FIG. 2 is a graphic illustration of the energy and temperature distributions within (A) a multi-mode microwave cavity, and (B) a variable frequency microwave cavity.

Graphical illustrations of the energy distribution and temperature profile for a multi-mode microwave reactor and a variable frequency microwave reactor are each shown in FIG. 2. For purposes of illustration, a method is described using a variable frequency microwave (VFM) that provides heating uniformity over large areas. By using a broadband microwave amplifier, over 4000 frequencies can swept continuously in millisecond time frames ensuring reliable mode density and energy uniformity.

A variety of activation methods can be used, including batch and continuous feed processes. Batch processes can include loading the feedstock mixture into a crucible that is introduced into the microwave reaction chamber. Suitable crucibles are compatible with microwave processing and resistant to alkali corrosion. Example crucibles can include metallic (e.g., nickel) crucibles, silicon carbide crucibles or silicon carbide-coated crucibles such as silicon carbide-coated mullite. Continuous feed processes, for example, can include screw-fed or rotary-fed operation. Carbon material in the form of a feedstock mixture can also be activated in a semi-continuous process where crucibles of the feedstock mixture are conveyed through a microwave reactor during the acts of heating and reacting.

Figure 3:
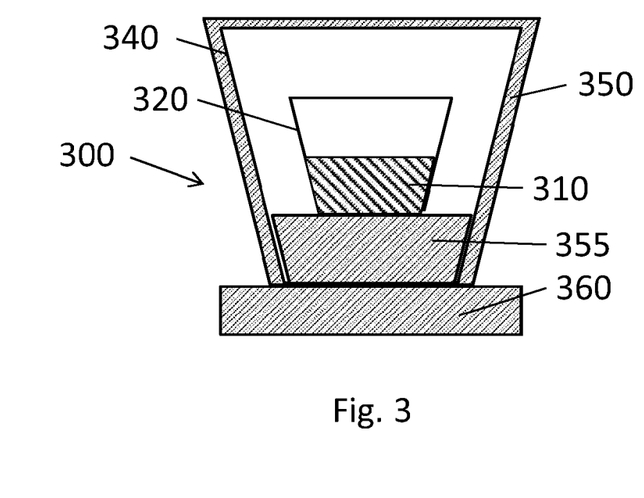
FIG. 3 is an example crucible design for forming activated carbon within a microwave reactor.

Suitable crucibles for holding and/or conveying the feedstock mixture may have a conical cross sectional shape that is wider at the mouth than at the base. Such a crucible containing a feedstock mixture can be at least partially surrounded by an additional insulation material such a refractory material in order to retain heat within the carbon feedstock during processing. An example configuration of a crucible that is partially enclosed within a refractory blanket is shown in FIG. 3. The crucible 300 includes a conical alumina crucible 320 for holding the feedstock mixture 310. The alumina crucible 320 is contained within a cast silica crucible 340, and the cast silica crucible 340 is, in turn, blanketed by a refractory insulation layer 350. Additional refractory insulation material can be provided as a refractory base 355 within the cast silica crucible 340, which provides a base for the alumina crucible 320. During activation within the microwave reaction chamber, the crucible 300 can rest on a refractory plate 360.

The feedstock material can be dry-fed or wet-fed into a microwave reaction chamber. A wet feedstock mixture, for example, can comprise a slurry that can be atomized or sprayed into a microwave reactor. Similarly, a dry feedstock mixture can be atomized or sprayed into the microwave reactor. By using microwave energy it is possible to have a continuous process without the need for a crucible conveyor, although a crucible conveyor can be used. For instance, both dry and wet feedstock mixtures can be loaded into a crucible that can be either held stationary or moved through a reaction zone of a microwave reaction chamber.

Figure 4:
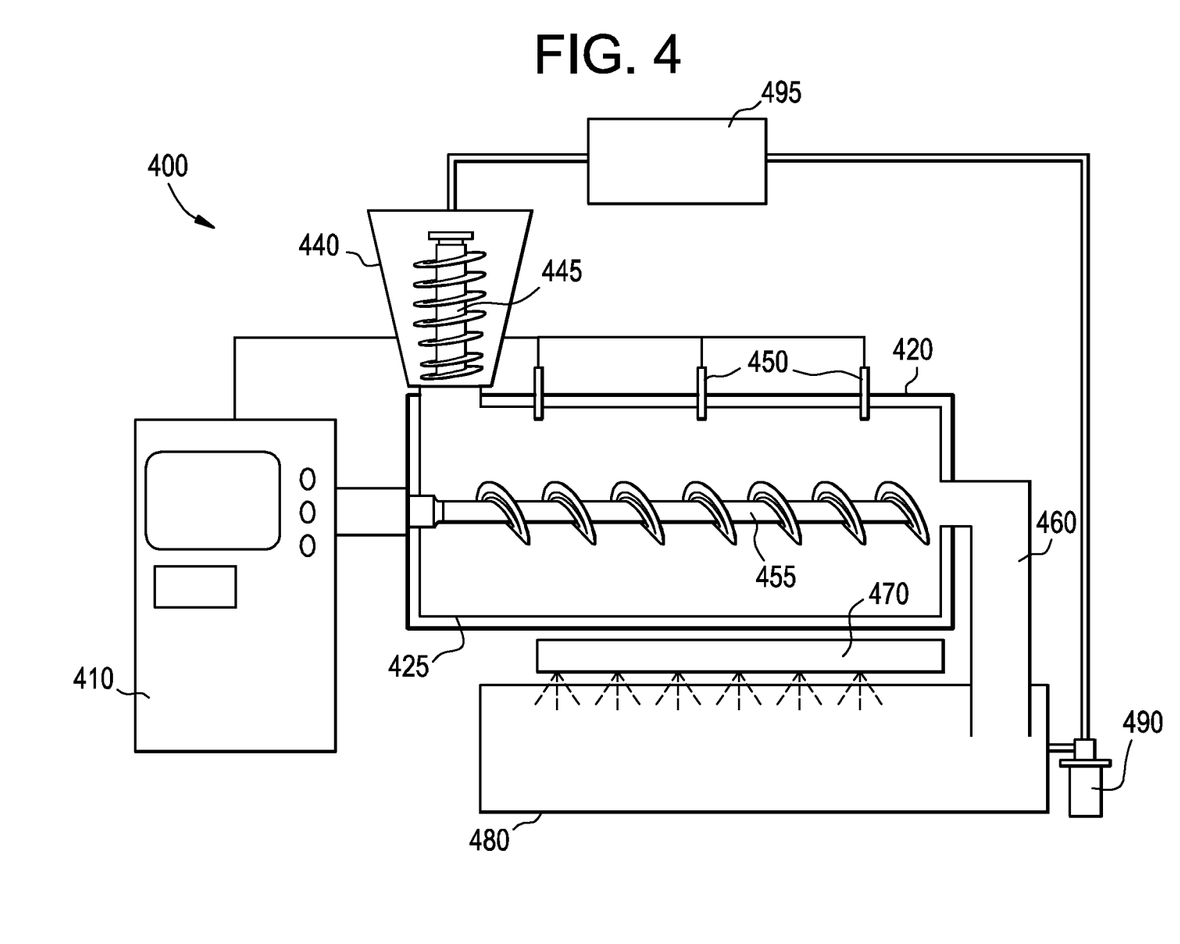
FIG. 4 is a schematic illustration of a microwave reactor for preparing activated carbon according one embodiment of the disclosure.

A schematic illustration of a continuous, dry or wet screw-fed process is shown in FIG. 4. System 400 includes a microwave source 410 such as, for example, a 0.915 or 2.45 GHz generator that is configured to produce microwaves and supply microwave energy to a microwave reaction chamber 420. The reaction chamber may include a waveguide. The reaction chamber, may include a liner 425 that comprises a material that is resistant to corrosion. A corrosion-resistant material may include a refractory material such as silicon carbide, silicon nitride, graphite, etc. A feedstock mixture can be fed into the reaction chamber 420 using a hopper 440 that may be optionally equipped with a feedstock mixture conveying means such as an auger 445. The reaction chamber 420 may include a feedstock conveying means 455 such as an auger that can facilitate continuous or semi-continuous movement of the feedstock mixture through the reaction chamber during the activation process.

As the activated carbon exits the reaction chamber via conduit 460, it can be held in a collection tank 480 where it is quenched with water provided by rinsing manifold 470. The rinse water can optionally be filtered and recycled using a pump 490 and filter 495. Gases produced during the heating/activation can be directed to a retort furnace or recycled via a heat exchanger. Sensors 450 can be fitted to the system 400 to provide process feedback and control. It will be appreciated that although a horizontal arrangement of the reaction chamber is shown, the system 400 could be configured vertically.

Figures 5A, 5B:
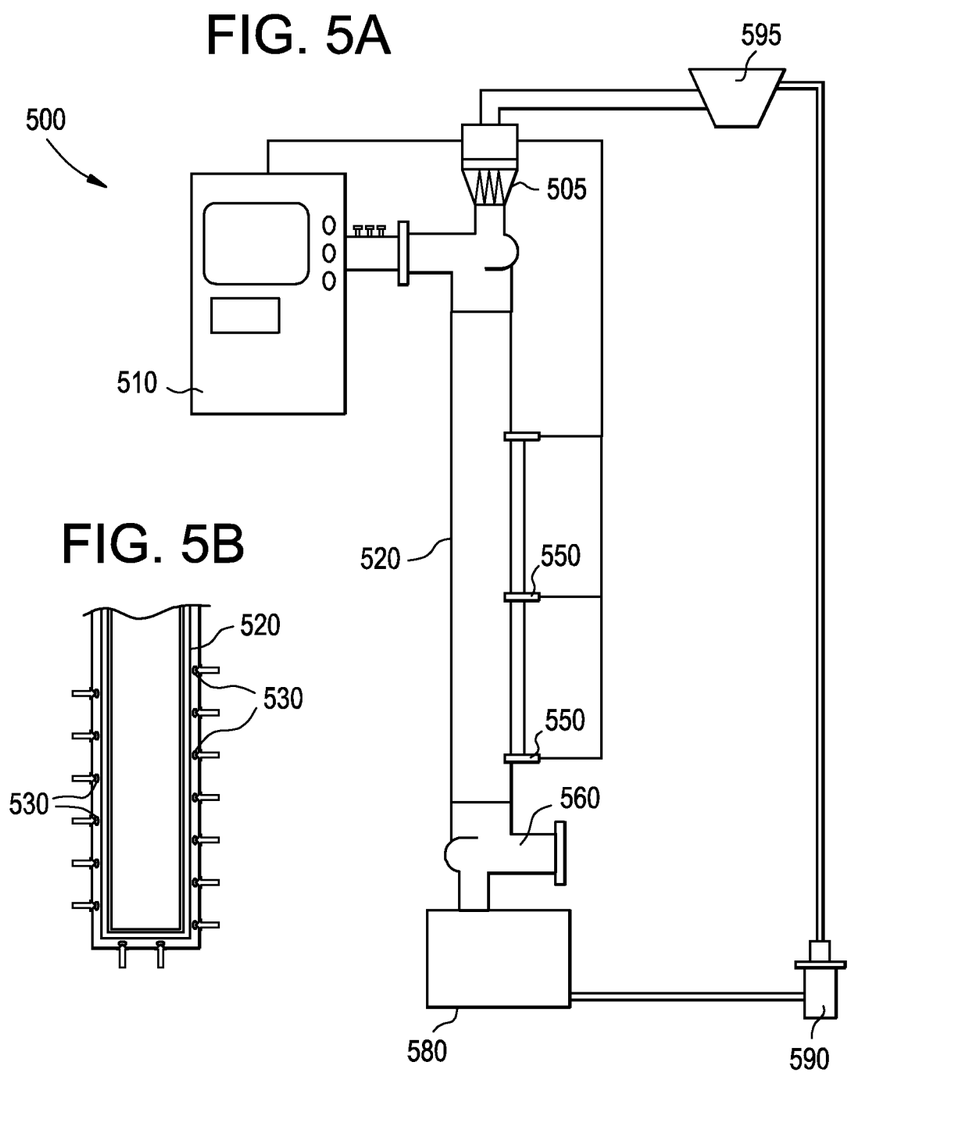
FIGS. 5A and 5B show a schematic illustration of a microwave reactor for preparing activated carbon according a further embodiment of the disclosure.

According to a further embodiment, illustrated in FIG. 5 is a continuous, single-mode, vertical, liquid-suspension or fine-particle microwave activation system 500. Dry particles or a liquid suspension of a feedstock mixture can be atomized or sprayed into microwave reaction chamber 520 using an atomizer or spray nozzle 505. System 500 includes a microwave source 510 that is configured to produce microwaves and supply microwave energy to the reaction chamber 520.

Process gases, which can include inert gases such as nitrogen or argon, can be introduced into the reaction chamber 520 via a plurality of gas inlets 530 illustrated in FIG. 5B in order to maintain a desired residence time of the feedstock mixture within the chamber. In addition to fluidizing (i.e., suspending) the feedstock mixture within the reaction chamber, the process gas can optionally include entrained steam or water vapor, which can minimize the formation of alkali metal during the heating and activation steps.

It will be appreciated that sodium metal or potassium metal, for example, will spontaneously combust upon exposure to air. Formation of alkali metals during the activation process can be prevented by scavenging alkali atoms with water vapor, which react to form alkali oxides or hydroxides. Thus, in embodiments, during the heating step, steam or water vapor entrained in an inert gas can be introduced into the reaction chamber. Following activation, the activated carbon can be quenched with water.

At the completion of the process, the activated carbon can be routed via conduit 560 into collection tank 580 where it is quenched with water. The rinse water can be filtered and recycled using a pump 590 and filter 595.

Figure 6:
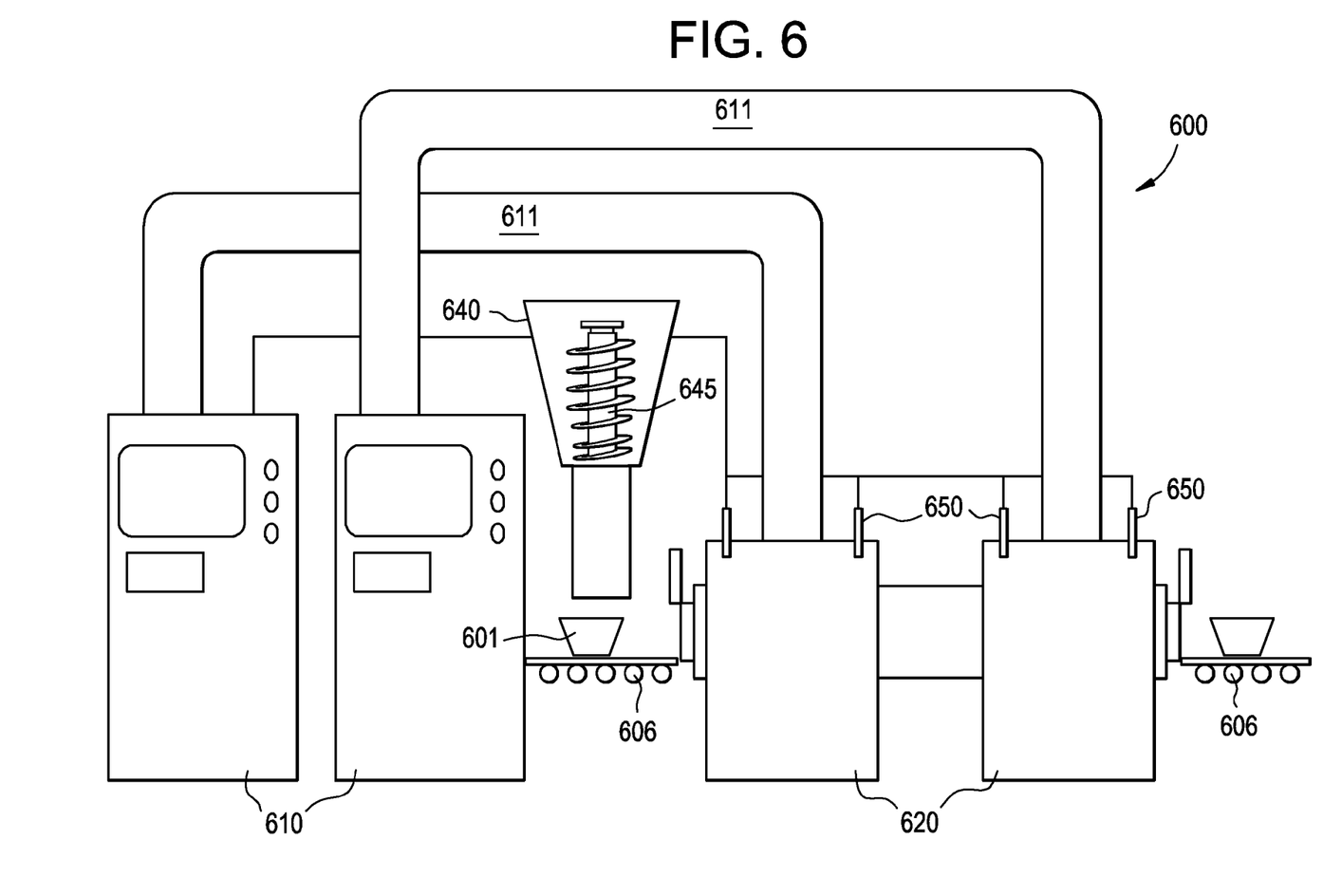
FIG. 6 is a schematic illustration of a microwave reactor for preparing activated carbon according a still further embodiment of the disclosure.

According to yet a further embodiment, a multi-mode continuous batch system is illustrated in FIG. 6. In the batch system 600, a feedstock mixture can be loaded into metallic, refractory or refractory-coated vessels 601 (i.e., SiC or SiC-coated mullite crucibles), which can then be fed through a series of microwave reaction chambers 620 using a conveyor system 606. The feedstock mixture can be loaded into the respective vessels using a hopper 640 optionally configured with an auger 645 for conveying the feedstock mixture. The sample temperature can be measured using a sheathed and grounded thermocouple. System 600 includes microwave sources 560 that are configured to produce microwaves and supply microwave energy via guides 611 to the reaction chambers 620.

It is believed that microwave-assisted activation of carbon occurs in the absence of any cross-linking (i.e., curing) of the feedstock material. As the heating progresses, water if present is removed from the feedstock mixture and the chemical activating agent melts and reacts with the carbon feedstock. The heating may form a viscous slurry of carbon and melted chemical activating agent, which in combination with the liberation of water from the mixture, may result in foaming as water is liberated.

To minimize the adverse effects of foaming, a multi-step temperature ramp can be used to avoid a significant build-up of pressure and instead allow for a gradual release of moisture. In embodiments, the heating comprises a plurality of step-wise increases in the power of the microwaves that are introduced into the microwave reaction chamber. This results in a plurality of heating steps at respective temperatures and for respective hold times. A hold time at each temperature step can range from about 10 to 30 min (e.g., 10, 15, 20, 25 or 30 min). In further embodiments, a transition time between successive hold temperatures can be less than 30 min., e.g., less than or equal to 30, 20, 10, 5 or 2 min.

In an example two heating-step method, the heating comprises heating to and holding at a first temperature for at least 10 minutes followed by heating to and holding at a second temperature greater than the first temperature for at least 10 minutes. In such a two-step approach, the first temperature can be in a range of 300 to 600° C., and the second temperature can be in a range of 650 to 850° C. In an example four heating-step method, the heating comprises heating to and holding at a first temperature for at least 10 minutes followed by heating to and holding at a second temperature greater than the first temperature for at least 10 minutes followed by heating to and holding at a third temperature greater than the second temperature for at least 10 minutes followed by heating to and holding at a fourth temperature greater than the third temperature for at least 10 minutes. In such a four-step approach, the first temperature can be in a range of 300 to 400° C., the second temperature can be in a range of 400 to 500° C., the third temperature can be in a range of 500 to 600° C., and the fourth temperature can be in a range of 650 to 850° C.

As used herein, a plurality of heating steps includes at least two different heating temperatures at respective heating (i.e., hold) times with a discrete transition between the first heating temperature and the second heating temperature.

Figure 7:
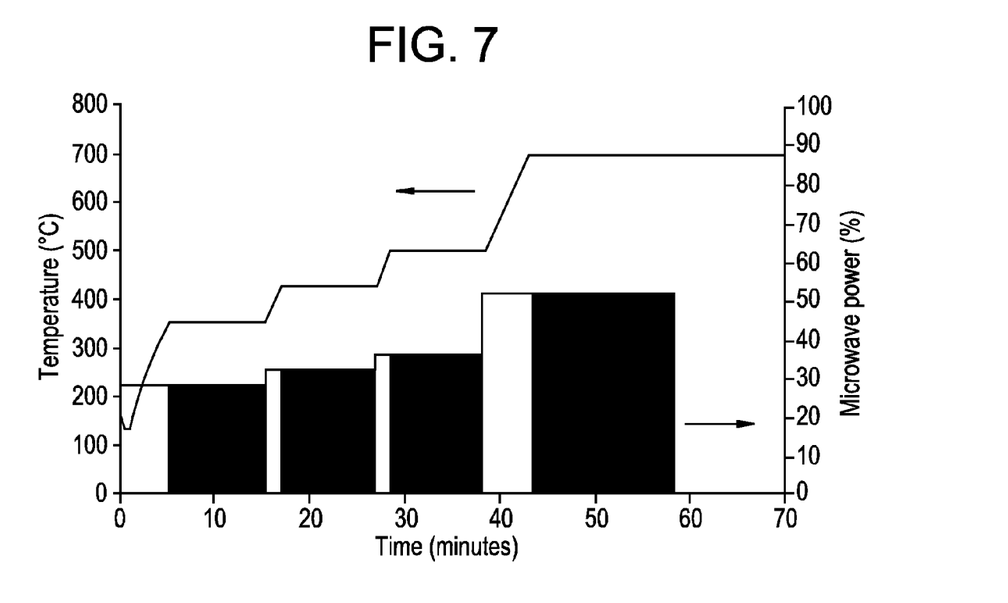
FIG. 7 is plot of temperature and microwave power versus time illustrating a plurality of heating steps according to one embodiment.
Figure 8:
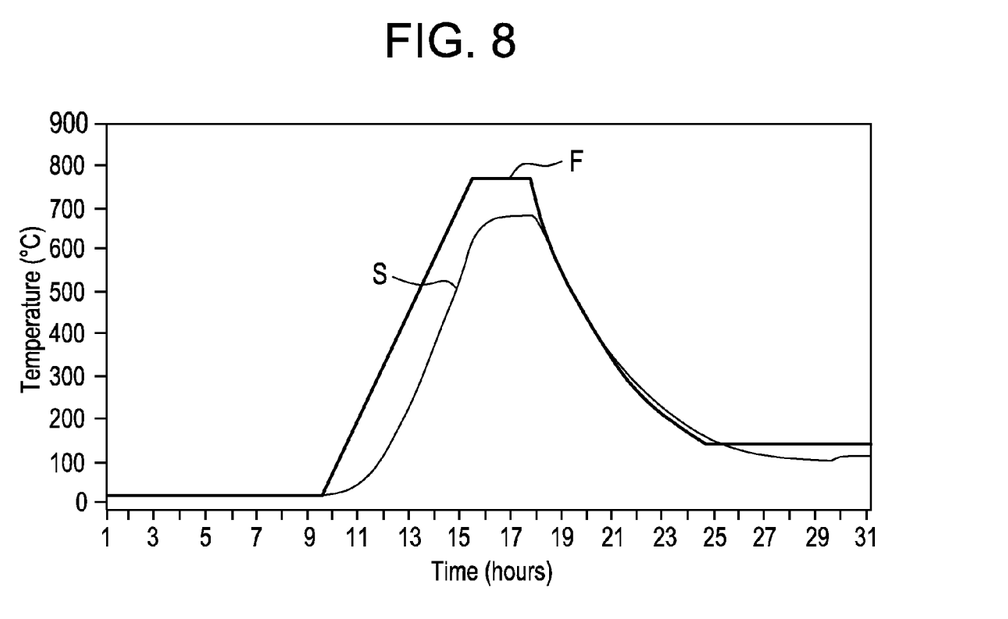
FIG. 8 is a plot of furnace temperature and furnace set point versus time for a comparative process.

A plot of microwave power (and resulting temperature) versus time for forming activated carbon within a refractory crucible in a C-band microwave reactor is shown in FIG. 7. The plot shows that the thermal cycle includes a plurality of discrete heating steps at successively higher microwave power and feedstock temperature. The activation process illustrated in FIG. 7 includes four discrete heating steps, which include, in succession, heating at 350° C. for about 10 min, then heating at 425° C. for about 10 min, then heating at 500° C. for about 10 min, and then heating at 700° C. for about 15 min, followed by a water quench. The volumetric expansion of the feedstock mixture with such a multi-step heating cycle was approximately 50%. A temperature versus time plot for a conventional furnace targeting the same maximum activation temperature of about 700° C. is shown for comparison in FIG. 8. The volumetric expansion of the feedstock mixture with a conventional heating cycle resulted in uncontrolled foaming of the sample. With reference to the button cell testing method disclosed below, the volumetric capacitance of the activated carbon made using the heating steps disclosed in FIG. 7 was about 95 F/cm$^3$, while the volumetric capacitance of the activated carbon made using the comparative temperature profile shown in FIG. 8 was about 93 F/cm$^3$. In FIG. 8 both the furnace set-point temperature (F) and the sample temperature (S) are shown. As will be appreciated, microwave energy can be used to substantially reduce the processing time to form activated carbon.

Figure 9:
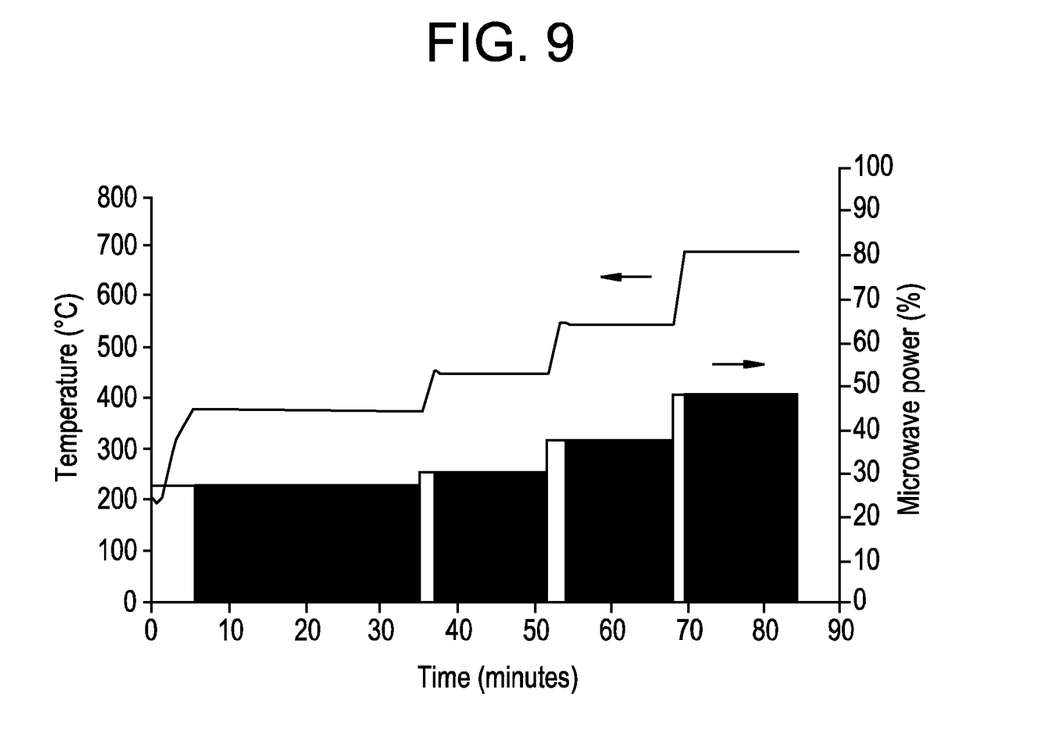
FIG. 9 is plot of temperature and microwave power versus time illustrating a plurality of heating steps according to a further embodiment.

A further plot of microwave power (and resulting temperature) versus time for forming activated carbon within a refractory crucible in a C-band microwave reactor is shown in FIG. 9. The activation process illustrated in FIG. 9 includes four discrete heating steps, which include, in succession, heating for about 30 min at 375° C., about 15 min at 450° C., about 15 min at 550° C., and about 15 min at 700° C., followed by a water quench.

By controlling the energy provided to the feedstock mixture during activation it is possible to reduce the expansion of volatile by-products while still providing an overall processing time that is shorter than for conventional furnace methods.

In embodiments, the geometry of the feedstock mixture can be tailored to optimize the activation process. For example, in non-fluidization embodiments, the feedstock mixture can be formed into a cake having specified dimensions in order to improve coupling with the microwave energy. For instance, a molded cake of the feedstock mixture can have at least one dimension (length, width or thickness) corresponding to an integral number of microwave wavelengths.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

After activation and quenching, the activated carbon can be optionally ground to a desired particle size and then washed in order to remove residual amounts of carbon, retained chemical activating agent as well as any chemical by-products derived from reactions involving the chemical activating agent. As noted above, the activated carbon can be quenched by rinsing with water prior to grinding and/or washing. The acts of quenching and washing can, in embodiments, be combined. Waste water used for quenching and/or washing can be filtered and then recycled.

Cooling may comprise rinsing the activated carbon with de-ionized water. Washing may comprise initially rinsing the activated carbon with de-ionized water, then rinsing with an acid solution, and finally rinsing again with de-ionized water. Such a washing process can reduce residual alkali content in the carbon to less than about 200 ppm (0.02 wt. %), compared with values greater than about 3 wt. % obtained with conventional extraction processes. The disclosed washing process can reduce total waste volume by about 65% compared with conventional washing steps, and can be performed at room temperature and ambient pressure.

The activated carbon can be incorporated into a carbon-based electrode of an ultracapacitor. An ultracapacitor, also known as a double-layer capacitor, polarizes an electrolytic solution to store energy electrostatically. Though it is an electrochemical device, no chemical reactions are involved in the energy storage mechanism. The mechanism is reversible, which allows the ultracapacitor to be charged and discharged many times.

Ultracapacitors typically comprise two porous electrodes that are isolated from electrical contact with each other by a porous dielectric separator. The separator and the electrodes are impregnated with an electrolytic solution that allows ionic current to flow between the electrodes while preventing electronic current from discharging the cell. Each electrode is typically in electrical contact with a current collector. The current collector, which can comprise a sheet or plate of electrically-conductive material (e.g., aluminum) can reduce ohmic losses while providing physical support for the porous electrode material.

Within an individual ultracapacitor cell, and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrode to generate an electrode potential.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices.

Figure 10:
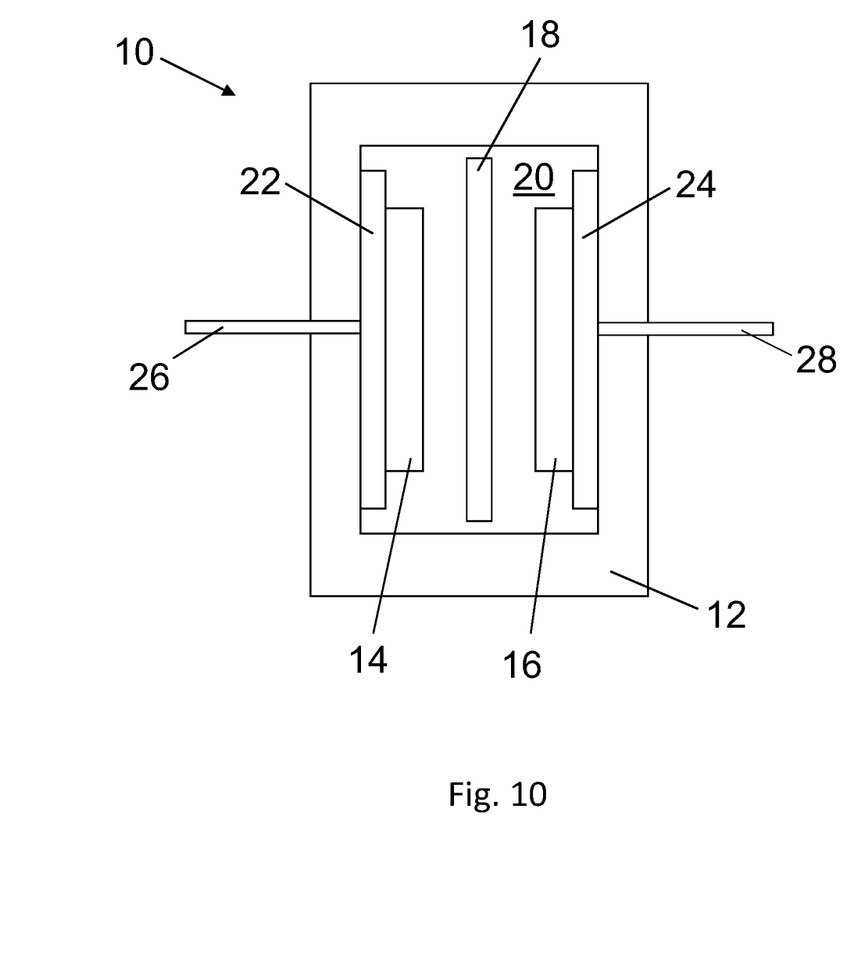
FIG. 10 is a schematic illustration of an example ultracapacitor.

FIG. 10 is a schematic illustration of an example ultracapacitor. Ultracapacitor 10 includes an enclosing body 12, a pair of current collectors 22, 24, a positive electrode 14 and a negative electrode 16 each respectively formed over one of the current collectors, and a porous separator layer 18. Electrical leads 26, 28 can be connected to respective current collectors 22, 24 to provide electrical contact to an external device. Electrodes 14, 16 comprise porous activated carbon layers that are formed over the current collectors. A liquid electrolyte 20 is contained within the enclosing body and incorporated throughout the porosity of both the porous separator layer and each of the porous electrodes. In embodiments, individual ultracapacitor cells can be stacked (e.g., in series) to increase the overall operating voltage. Ultracapacitors can have a jelly roll design, prismatic design, honeycomb design, or other suitable configuration.

The enclosing body 12 can be any known enclosure means commonly-used with ultracapacitors. The current collectors 22, 24 generally comprise an electrically-conductive material such as a metal, and commonly are made of aluminum due to its electrical conductivity and relative cost. For example, current collectors 22, 24 may be thin sheets of aluminum foil.

Porous separator 18 electronically insulates the carbon-based electrodes 14, 16 from each other while allowing ion diffusion. The porous separator can be made of a dielectric material such as cellulosic materials, glass, and inorganic or organic polymers such as polypropylene, polyesters or polyolefins. In embodiments, a thickness of the separator layer can range from about 10 to 250 microns.

The electrolyte 20 serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. patent application Ser. No. 13/011,066, the disclosure of which is incorporated herein by reference. An example quaternary ammonium salt is tetraethylammonium tetrafluoroborate (($Et)_4NBF_4$).

Example solvents for the electrolyte include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrro lidone. In embodiments, the electrolyte includes a polar aprotic organic solvent such as a cyclic ester, chain carbonate, cyclic carbonate, chain ether and/or cyclic ether solvent. Example cyclic esters and chain carbonates have from 3 to 8 carbon atoms, and in the case of the cyclic esters include β-butyro-lactone, γ-butyrolactone, γ-valerolactone and δ-valerolactone. Examples of the chain carbonates include dimethyl carbonate, diethyl carbonate, dipropyl carbonate, ethylene carbonate, methyl ethyl carbonate, methyl propyl carbonate and ethyl propyl carbonate. Cyclic carbonates can have from 5 to 8 carbon atoms, and examples include 1,2-butylene carbonate, 2,3-butylene carbonate, 1,2-pentene carbonate, 2,3-pentene carbonate and propylene carbonate. Chain ethers can have 4 to 8 carbon atoms. Example chain ethers include dimethoxyethane, diethoxyethane, methoxyethoxyethane, dibutoxyethane, dimethoxypropane, diethoxypropane and methoxyethoxypropnane. Cyclic ethers can have from 3 to 8 carbon atoms. Example cyclic ethers include tetrahydofuran, 2-methyl-tetrahydrofuran, 1,3-dioxolan, 1,2-dioxolan, 2-methyldioxolan and 4-methyl-dioxolan. A combination of two or more solvents may also be used.

Optionally, in conjunction with the foregoing methods for producing a carbon-based electrode, the activated carbon can be mixed with carbon black and/or a polymeric binder such as polytetrafluroethylene (PTFE) or other suitable binder and compacted to form the carbon-based electrode.

Electrical properties of the carbon can be obtained by incorporating the activated carbon into carbon-based electrodes, which are in turn incorporated into an ultracapacitor. To form the carbon-based electrodes, the activated carbon is first combined with conductive carbon (e.g., Black Pearls®, which is marketed by Cabot Corporation, Boston, Mass.) and Teflon® (PTFE). The carbon black serves as a conductive additive and the PTFE serves as a binder.

By way of example, a carbon paper having a thickness in the range of about 100-300 micrometers can be prepared by rolling and pressing a powder mixture comprising 60-90 wt. % activated carbon, 5-20 wt. % carbon black and 5-20 wt. % PTFE. The carbon-based electrodes can be rolled into jelly roll using a cellulosic separator, and then placed into an aluminum can.

Ultracapacitors can have a jelly roll design, prismatic design, honeycomb design, or other suitable configuration. A carbon-based electrode made according to the present disclosure can be incorporated into a carbon-carbon ultracapacitor or into a hybrid ultracapacitor. In a carbon-carbon ultracapacitor, both of the electrodes are carbon-based electrodes. In a hybrid ultracapacitor, on the other hand, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

The performance of electro-chemical double layer capacitors (EDLCs) comprising carbon-based electrodes can be intimately related to the properties of the carbon. The activated carbon materials disclosed herein can be used to form carbon-based electrodes for economically viable, high power, high energy density devices. The properties of the activated carbon, in turn, can be gauged by evaluating the surface area, porosity and pore size distribution of the material, as well as by evaluating the electrical properties of a resulting ultracapacitor. Relevant electrical properties include the area-specific resistance, and the specific capacitance.

In embodiments, the activated carbon can be characterized by a high surface area. A carbon-based electrode for an EDLC can include carbon having a specific surface area greater than about 300 $m^2$/g, i.e., greater than 300, 350, 400, 500 or 1000 $m^2$/g. Further, the activated carbon can have a specific surface area less than 2500 $m^2$/g, i.e., less than 2500, 2000, 1500, 1200 or 1000 $m^2$/g.

The activated carbon can comprise micro-, meso- and/or macroscale porosity. As defined herein, microscale pores have a pore size of 2 nm or less and ultra-microscale pores have a pore size of 1 nm or less. Mesoscale pores have a pore size ranging from 2 to 50 nm. Macroscale pores have a pore size greater than 50 nm. In an embodiment, the activated carbon comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity).

According to embodiments, a carbon-based electrode for an EDLC comprises activated carbon having a total porosity greater than about 0.2 cm³/g (e.g., greater than 0.2, 0.25, 0.3, 0.35, 0.4, 0.45, 0.5, 0.55, 0.6, 0.65 or 0.7 cm³/g). The portion of the total pore volume resulting from micropores (d≤2 nm) can be about 90% or greater (e.g., at least 90, 94, 94, 96, 98 or 99%) and the portion of the total pore volume resulting from micropores (d≤1 nm) can be about 50% or greater (e.g., at least 50, 55, 60, 65, 70, 75, 80, 85, 90 or 95%).

The pore size distribution of the activated carbon can include ultramicropores, micropores, mesopores and macropores and may be characterized as having a unimodal, bimodal or multi-modal pore size distribution. The ultramicropores can comprise 0.2 cm³/g or more (e.g., 0.2, 0.25, 0.3, 0.35 or 0.4 cm³/g or more) of the total pore volume. Pores having a pore size (d) in the range of 1<d≤2 nm can comprise 0.05 cm³/g or more (e.g., at least 0.1, 0.15, 0.2 or 0.25 cm³/g) of the total pore volume. If present, any pores having a pore size greater than 2 nm, which may include mesopores and/or macropores, can comprise 0.15 cm³/g or less (e.g., less than 0.1 or 0.05 cm³/g) of the total pore volume.

In examples, activated carbon, carbon black and PTFE are blended in the proportion of 85:5:10 by weight together with isopropyl alcohol and rolled into thin sheets, which are laminated onto aluminum current collectors and then dried overnight at about 120° C. The thin sheets have a thickness of about 130 microns.

Button cells for evaluating the electrical properties of the activated were fabricated with free-standing carbon electrodes. A button cell can be formed by punching carbon electrodes having a diameter of 0.625 inches from sheets of the electrode material. A separator is placed between identical carbon electrodes which, in turn, are sandwiched between two conductive carbon-coated aluminum current collectors. A thermoset polymer ring is formed around the periphery of the carbon electrodes to seal the cell, which is filled with an organic electrolyte such as 1.5M tetraethylammonium-tetrafluoroborate (TEA-TFB) in acetonitrile.

The capacitance of the cell ($C_{cell}$) is measured from galvanostatic discharge. The cell is first charged at a constant current (icharge) to a desired potential (e.g., 2.7 V), which is followed by a constant current discharge (idischarge). According to Ohm's law, capacitor current (i) is proportional to the time derivative of capacitor voltage according to:

$$i = C \frac{dV}{dt} \tag{1}$$

where C is capacitance, V is the cell voltage (in Volts) and t is time (in seconds).

By measuring the slope from the galvanostatic discharge curve (cell voltage vs. time), the cell capacitance (in Farads) can then be calculated as:

$$C_{cell} = \frac{i_{discharge}}{dV/dt} \tag{2}$$

The cell capacitance is the harmonic sum of two individual capacitances represented by the electrochemical double layer capacitance of each of the carbon electrodes (capacitors in series). This relationship can be expressed as:

$$\frac{1}{C_{cell}} = \frac{1}{C_1} + \frac{1}{C_2} \tag{3}$$

where $C_1$ and $C_2$ are the double layer capacitances of the individual carbon electrodes in the cell.

The magnitudes of these capacitances can be correlated to the volumetric specific capacitance of the carbon electrodes as:

$$C_1 = C_{sp,1} \times V_1 \tag{4}$$

$$C_2 = C_{sp,2} \times V_2 \tag{5}$$

where $C_{sp,1}$ and $C_{sp,2}$ are specific capacitances of the individual carbon electrodes (in F/cm³) and $V_1$ and $V_2$ are the corresponding electrode volumes. Because the test cell uses electrodes having identical size and composition, $C_1=C_2$, $C_{sp,1}=C_{sp,2}$ ($=C_{sp}$) and $V_1=V_2$ ($=V_{total}/2$, where $V_{total}$ is the total volume (cm³) of carbon electrodes in the cell). Equations (3), (4) and (5) can be combined to give a volumetric capacitance, $C_{sp}$ as:

$$\frac{1}{C_{cell}} = \frac{2}{C_{sp} \times V_{total}} + \frac{2}{C_{sp} \times V_{total}} \tag{6}$$

or, $$C_{sp} = \frac{4 \times C_{cell}}{V_{total}} \tag{7}$$

EXAMPLES

The invention will be further clarified by the following examples.

Example 1

Activated carbon was prepared using a single-mode reactor where dry mixtures of carbon feedstock particles and KOH were passed through approximately 6 feet of waveguide connected to a 1.8 kW 2.45 GHz generator. Nitrogen humidified with de-ionized water was introduced into the waveguide during processing to mitigate the formation of alkali metal. The waveguide was lined with quartz to limit corrosion due to contact with alkali species.

Example 2

Activated carbon was prepared using a single-mode reactor where dry mixtures of carbon feedstock particles and KOH were loaded into a quartz crucible that was moved in and out of a C-band (5.85-6.65 GHz) microwave reactor using a DC motor at a controlled rate of speed. The extent of the activation reaction was controlled by controlling the residence time of the feedstock/KOH mixture within the reactor.

Activated carbon was preparing using a microwave-assisted, plural heating step chemical activation method. In conjunction with the controlled temperature ramp, broad-faced, open crucibles were used to decrease or eliminate foaming during reaction between the carbon and the alkali hydroxide activating agents. Although the formation of alkali metal occurred when processing in a dry atmosphere, alkali metal formation was avoided by bubbled an inert process gas through de-ionized water and into the microwave reaction chamber during the activation process.

As used herein, the singular forms "a," "an" and "the" include plural referents unless the context clearly dictates otherwise. Thus, for example, reference to "an activating agent" includes examples having two or more such "activating agents" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a carbon feedstock that comprises a carbonized material include embodiments where a carbon feedstock consists of a carbonized material and embodiments where a carbon feedstock consists essentially of a carbonized material.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for forming activated carbon, comprising:
providing a carbon feedstock;
mixing the carbon feedstock with a chemical activating agent to form a feedstock mixture;
introducing the feedstock mixture into a microwave reaction chamber;
heating the feedstock mixture using microwave energy by introducing microwaves into the reaction chamber;
reacting the carbon feedstock with the chemical activating agent to form activated carbon; and
cooling the activated carbon, wherein the heating comprises a plurality of heating steps at respective processing temperatures, and the feedstock mixture is sprayed into the microwave reaction chamber during the acts of heating and reacting.

2. The method according to claim 1, wherein providing the carbon feedstock comprises carbonizing a carbonaceous material in an inert atmosphere at a temperature ranging from about 500 to 950° C.

3. The method according to claim 2, wherein the carbonizing comprises introducing the carbonaceous material into a microwave chamber and heating the carbonaceous material using microwave energy by introducing microwaves into the reaction chamber.

4. The method according to claim 1, wherein the carbon feedstock comprises carbon feedstock particles having an average particle size of less than 100 microns.

5. The method according to claim 1, wherein the chemical activating agent is selected from the group consisting of $H_3PO_4$, NaOH, $Na_2CO_3$, NaCl, $MgCl_2$, KOH, $AlCl_3$, $P_2O_5$, $K_2CO_3$, KCl and $ZnCl_2$.

6. The method according to claim 1, wherein a mass ratio of carbon feedstock to chemical activating agent ranges from about 1:10 to 10:1.

7. The method according to claim 1, further comprising introducing water vapor into the reaction chamber during the acts of heating and reacting.

8. The method according to claim 1, further comprising introducing humidified nitrogen into the reaction chamber during the acts of heating and reacting.

9. The method according to claim 1, wherein cooling the activated carbon comprises rinsing the activated carbon with water.

10. The method according to claim 1, wherein particles of the feedstock mixture are suspended within the microwave reaction chamber during the acts of heating and reacting.

11. The method according to claim 1, wherein the feedstock mixture is continuously transported through the reaction chamber during the acts of heating and reacting.

12. The method according to claim 1, wherein the microwave energy comprises variable frequency microwave energy.

13. The method according to claim 1, wherein the microwave reaction chamber comprises a waveguide.

14. The method according to claim 1, wherein the microwave reaction chamber comprises a waveguide lined with a refractory material.

15. A method for forming activated carbon, comprising:
providing a carbon feedstock;
mixing the carbon feedstock with a chemical activating agent to form a feedstock mixture;
introducing the feedstock mixture into a microwave reaction chamber;
heating the feedstock mixture using microwave energy by introducing microwaves into the reaction chamber;
reacting the carbon feedstock with the chemical activating agent to form activated carbon; and
cooling the activated carbon,
wherein the heating comprises a plurality of heating steps at respective processing temperatures and further comprising forming the feedstock mixture into a cake and introducing a caked feedstock mixture into the microwave reaction chamber, wherein the cake has a length dimension equal to an integral number of wavelengths of the microwaves.

16. The method according to claim 15, wherein the feedstock mixture is a dry mixture of carbon feedstock particles and the chemical activating agent.

17. The method according to claim 15, wherein the feedstock mixture is loaded into a crucible that is introduced into the microwave reaction chamber.

18. The method according to claim 15, wherein the feedstock mixture is loaded into a crucible comprising silicon carbide that is introduced into the microwave reaction chamber.

19. The method according to claim 15, wherein the heating comprises a plurality of step-wise increases in the power of the microwaves that are introduced into the microwave reaction chamber.

20. The method according to claim 15, wherein a transition time between successive heating steps is less than 30 min.

21. The method according to claim 15, wherein the heating comprises heating to and holding at a first temperature for at least 10 minutes followed by heating to and holding at a second temperature greater than the first temperature for at least 10 minutes.

22. A method for forming activated carbon, comprising:
providing a carbon feedstock;
mixing the carbon feedstock with a chemical activating agent to form a feedstock mixture;
introducing the feedstock mixture into a microwave reaction chamber;
heating the feedstock mixture using microwave energy by introducing microwaves into the reaction chamber;
reacting the carbon feedstock with the chemical activating agent to form activated carbon; and
cooling the activated carbon,
wherein the heating comprises a plurality of heating steps at respective processing temperatures such that the heating comprises heating to and holding at a first temperature for at least 10 minutes followed by heating to and holding at a second temperature greater than the first temperature for at least 10 minutes followed by heating to and holding at a third temperature greater than the second temperature for at least 10 minutes followed by heating to and holding at a fourth temperature greater than the third temperature for at least 10 minutes.

23. The method according to claim 22, wherein the first temperature is in a range of 300 to 400° C., the second temperature is in a range of 400 to 500° C., the third temperature is in a range of 500 to 600° C., and the fourth temperature is in a range of 650 to 850° C.

* * * * *